United States Patent [19]
Scheffler

[11] Patent Number: 5,021,893
[45] Date of Patent: Jun. 4, 1991

[54] HIGH SPEED TAPE DUPLICATING MACHINE

[75] Inventor: Robert G. Scheffler, Wheaton, Ill.

[73] Assignee: Duplitronics, Inc., Wheeling, Ill.

[21] Appl. No.: 253,067

[22] Filed: Oct. 4, 1988

Related U.S. Application Data

[63] Continuation-in-part of Ser. No. 133,936, Dec. 17, 1987, which is a continuation-in-part of Ser. No. 874, Jan. 6, 1987, abandoned.

[51] Int. Cl.$^5$ ............................................. G11B 5/86
[52] U.S. Cl. ......................................... 360/15; 360/32
[58] Field of Search ................................... 360/15–17; 369/84, 85

[56] References Cited

U.S. PATENT DOCUMENTS

| | | |
|---|---|---|
| 4,375,655 | 3/1983 | Korth et al. |
| 4,703,465 | 10/1987 | Parker ................................. 369/85 |
| 4,707,750 | 11/1987 | Anderson et al. |
| 4,766,581 | 8/1988 | Korn et al. |
| 4,786,983 | 11/1988 | Massari ................................ 360/15 |
| 4,811,325 | 3/1989 | Sharples, Jr. et al. ............. 360/15 |
| 4,835,682 | 5/1989 | Kurachi et al. .................... 360/15 |
| 4,899,230 | 2/1990 | Sheritt ................................ 360/15 |

FOREIGN PATENT DOCUMENTS

| | | |
|---|---|---|
| 58-130414 | 8/1983 | Japan. |
| 60-050626 | 3/1985 | Japan. |
| 62-202332 | 9/1987 | Japan. |
| 2137401 | 10/1984 | United Kingdom. |

*Primary Examiner*—Vincent P. Canney
*Attorney, Agent, or Firm*—Welsh & Katz, Ltd.

[57] ABSTRACT

A duplicate recording system uses video cassettes for storing master library recordings. On both the recording and the duplicating ends of the system, all signals are buffer stored in an electronic memory while the signals are in a digital form. This buffer storage completely isolates the recording/reproducing steps so that the usual parameter of restraints disappear. For example, the duplication ratio may be any value within the capabilities of the recording/reproducing machines. This isolation eliminates expensive setup procedures heretofore required to switch from one to another duplicating ratio. The buffer storage also provides a more precise transfer with greater fidelity of the recorded signals. A computer calculates a smoother analog curve when the digital-to-analog conversion is made.

9 Claims, 16 Drawing Sheets

HIGH SPEED TAPE DUPLICATING MACHINE

This is a continuation-in-part of Ser. No. 07/133,936 filed Dec. 17, 1987, which, in turn, was a continuation-in-part of Ser. No. 07/000,874 filed Jan. 6, 1987, now abandoned.

This invention relates to recording/reproducing machines and more particularly to high speed duplicating machines, especially—but not necessarily exclusively—for recording music on any suitable medium.

The invention will find many uses; however, for convenience of expression, the following specification may refer to the making of audio tape cassettes. Nevertheless, it should be understood that the invention may be used to duplicate almost any recorded information. For example, it may be desirable to duplicate compact disks which are now coming into widespread use as storage media for many things such as books, x-ray pictures, graphics, data base information, and the like. The information may be duplicated on any kind of media, such as tape, film, compact disks, or the like. Further, the duplicator machine may be used to store information in any suitable form which may be selected by a computer. For example, an attorney who is going into a trial may store information such as briefs, motions, exhibits, and the like, which may be called up during the trial by typing an address into a computer. Therefore, in the following specification, the references to "audio tape cassettes" are to be construed broadly enough to cover all of these source or program materials and recording media.

More particularly, this invention pertains to a high-speed duplication of recorded material. This recorded material may be music, voice, computer software or any other suitable material that may be produced at high speeds and in multiple quantities. An example of a product recorded by the inventive system could be an album recorded on a magnetic tape cassette that is offered for sale in retail record stores. These tapes need to be produced in very large quantities in order to meet consumer demands.

The production problem is that cassette tapes cannot be reliably run at very high speeds while the tape is in the cassette shell. Therefore, it is customary to record the magnetic tape before it is placed into the cassette shell. For this and other reasons, the cassette tape is manufactured and sold on a large tape reel, called a "pancake", which often contains enough tape to fill twenty to thirty cassettes; therefore, many copies of the source material are recorded on the pancake.

Most systems for recording cassettes use an endless loop of master tape that is mounted on pulleys in order to go around and around, once around the loop for each length of the original program material, which is usually recorded in an analog form. To prevent this loop from becoming tangled or broken, it is generally placed in a holding bin with one end of the loop coming out of the bin, going across the playback head, and then returning into the bin. The problem with these bin systems is that the tape can become tangled, broken, or worn out merely from going around the loop, hundreds of times a day. Therefore, a master tape loop often has to be replaced several times a day, to prevent signal degradation as the oxide is scraped off by the playback head.

Ideally, a system would run infinitely fast in order to produce the greatest possible amount of product each day. However, the speed is limited because the tape passing at high speed across the playback head creates an air gap and tends to ride on an air cushion between the tape and head. One approach to solve this air gap problem is to use an elaborate system of compressed air to press the tape against the playback head. Unfortunately, the resulting pressure acting on the tape causes even more oxide to be scraped off the tape during playback and requires the tape loop to be replaced even more frequently than it would have to be replaced at lower speeds.

Master tape equalization becomes a problem when different jobs need to be run at different duplication ratios. If the slave recorder is to run at 32:1 (32 times real time), the master tape needs to be recorded at one tape speed. Another master tape is required if the recorder needs to run at 64:1, another for 80:1 and yet another for 128:1. This means that either four different machines are required in this example; or, a substantial set up time is required whenever the duplication ratio is changed. The air gap or air cushion problems arise at about 128:1; therefore, the prior art duplicating machines become very exotic if the master tape needs to run at such high speeds.

Accordingly, an object of the invention is to provide new and improved duplicating machines. In this connection, an object is to provide magnetic tape duplicating machines which overcome the above described drawbacks, and in particular machines which provide master tapes with a longer life.

Another object of the invention is to eliminate the need to run the master tape past the recording head every time that a duplicate tape is made.

Still another object of the invention is to provide superior fidelity in duplicated tapes. Here, an object is to eliminate problems heretofore encountered when the duplication ratio is changed.

In keeping with an aspect of the invention, these and similar objects are accomplished by a system which uses a video cassette as the master tape to permanently store the library master recorded material. A high speed tape drive is used to read the library master from the tape of the video cassette and into an electronic memory. Once the library master recorded material has been read into an electronic memory, the video cassette is removed from the machine and thereafter the machine records directly from the electronic memory, making any suitable number of duplicate recordings.

Since an electronic memory is used to duplicate the stored library master material, there is no tape loop to tangle, break or wear out. This use of the electronic memory also eliminates the air gap problems associated with the higher tape speeds on the master tape reader. Since the duplicated tape makes only one pass across the recording head at high speed, the slight wear caused by air pressure upon the back of the tape poses no problem. Since all musical information is being recreated from an electronic memory, master tape equalization is not a problem. In fact, the recreated master material stored in the electronic memory is exactly the same quality regardless of whether the duplication ratio is 16:1 (16 times real time) or 128:1 or some other ratio. This means that the duplication speed is only limited by the speed capability of the slave cassettes which are being recorded, without any concern for how the master tape was originally recorded. Therefore, if at a future date, faster recording slave cassettes become available, duplicate recordings may be made without having to either re-master or re-record the master tape.

Once a library master tape has been created on a video cassette, it can be stored almost indefinitely for future use. The library master tape also stores all critical machine parameters, so that a library master tape can be pulled off the shelf and re-run to produce a duplicate tape without requiring any critical operator setup being required.

Yamamoto et al. (U.S. Pat. No. 4,355,338) describes a system that converts an analog master tape into digital signals that are stored on discs. These discs are then loaded into the slave recording device which reproduces tape cassettes on the slave tape recording device. The advantages of the Yamamoto et al. system is mostly speed independence except that, with present disc technology, it is only possible to produce a low to medium duplication ratio which cannot serve the higher speeds, such as 80:1 and 128:1. A major disadvantage is that Yamamoto relies on machinery with moving parts which will eventually wear out.

Newdoll et al. (U.S. Pat. No. 4,410,917) has no provision for storing the master library material on a removable medium for archive purposes. This means that, in order to maintain quality, the original master analog tape must be pre-recorded into memory for every job that is to be run, presumably at a speed which is slower than the actual duplication speed. This pre-recording process takes a long time and tends to produce inconsistent results. This Newdoll et al patent also uses a data compression technique that could possibly be unusable on some types of cassette tape. With other tape technology, the compression technique may limit the quality of the audio signal that can be recorded on the cassette tape.

The inventive system is thought to be ideal because, after the library master video cassette is loaded into the production line unit, the slave tapes can be duplicated again and again over an indefinite time period with neither signal degradation nor operator intervention. Another advantage of the invention is the very fast library master tape load time. Therefore, a production line that has frequent changes of source tapes is able to load a new 48-minute source tape in under two minutes. In fact, the library master tape can be read out of the video cassette faster than an operator thread the reel-to-reel type of master tape used on prior equipment of a similar type.

Since the inventive system uses no data compression, the duplication tapes have the highest possible quality. Also, since the invention can use over-sampled output converters, the machine speed may be made a completely independent parameter so that the duplication speed ratios can be changed at will.

A preferred embodiment of the invention is shown in the attached drawing wherein.

For most purposes—and especially for descriptive purposes—the inventive system may be split into two machines, one machine being used to translate program source material into a library master tape format and the other being used to duplicate tapes from the master tape. However, it does not necessarily follow that a single machine cannot be used to perform both functions. Quite the contrary, for some small scale uses, such as in a retail record store, a single machine may be preferred.

The program source translation unit for making library master recordings (FIG. 1) can accept signals from either an analog source (a microphone, tape machine, phonograph or the like) or a standard digital interface source (Digital Tape, compact disk, or DAT). One great advantage of the inventive system is its ability to directly transfer a digital tape used for making a compact disc or the compact disc itself as a source of material without having to convert from digital-to-analog and back to digital. This gives the duplicated cassette a quality which is as high as it would be if it were recorded directly from the original digital source tape with no degradation of sound resulting from the various conversions that would otherwise be necessary. The other half of the system (FIG. 11) is a control circuit used for making duplicate recordings of slave tapes. This unit may directly replace the present recording units, so that the existing slave tape drive units may continue to be used.

Since the system may be split into two machines, the cost of a production line unit may be reduced significantly because the complex translation of analog-to-digital, or digital-to-analog can be done on a less expensive mastering unit. Also, since the mastering process takes some time, it is advantageous not to tie up an entire production line of valuable slave recorders in order to do the mastering.

FIGS. 1-10 describe the mastering machine which is used to create the library master tape by translating an output of an analog source or digital source material into the format that is stored first in an electronic memory and then from that storage onto the library master tape.

FIGS. 11 through 18 describe the reproduction unit that reads the library master tape into an electronic memory and then writes the stored data at a higher speed through digital-to-analog converters to one or more slave recording machines.

Figure 1:
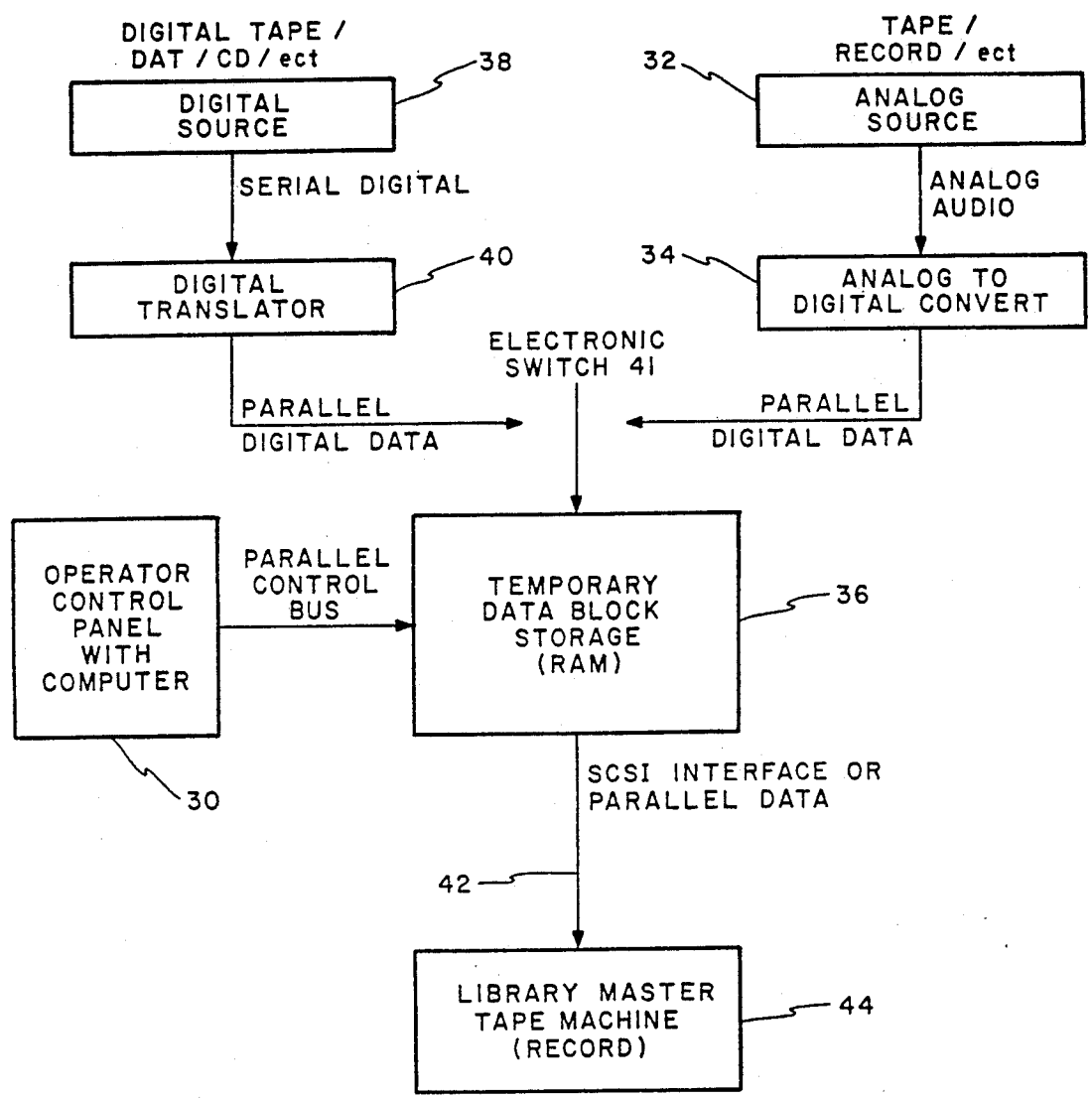
FIG. 1 is a block diagram showing the principles of the invention in a library master recording system.

FIG. 1 shows an overall block diagram of the mastering machine with an analog-to-digital converter 34 and a digital translator 40, which comprise alternate sources of signals with a switch 41 for selecting therebetween. The operator controls switch 41 to select between these and, perhaps, various other types of source material and to indicate either a digital or analog type of signal source. Then, the operator presses a start button (not shown) at panel and control computer 30.

If an analog source is to be used, the control computer 30 starts the analog source transport 32 assuming that the source is a recording. Then, the analog signals are sent through analog-to-digital converter 34, there being one such converter for each of the source channels. The information out of the analog-to-digital converter 34 is in a parallel binary data format that is sent for storage in an electronic memory forming the temporary data block storage circuit 36.

If a digital source is used, the control computer starts the digital source transport 38, again assuming that the source is a recording. Then the digital information goes into the digital translator 40 in a serial form. The digital translator 40 translates the serial digital information into two sets of parallel binary data, one for the left channel and one for the right channel of the duplicate recording. This parallel information then goes into electronic storage in the temporary data block storage 36.

Regardless of whether it begins with an analog or a digital source, the data is stored in the electronic memory at an address which is selected by the control computer 30. Also, regardless of whether it begins as analog or digital data, it is stored until a full block of all data required for an entire selection is ready to be recorded onto the library master tape.

When the block of data is ready to be sent, the control computer 30 starts the library master tape drive transport and data is sent over parallel data buses 42 to the tape drive 44. Optionally, the tape drive could use an SCSI (Small Computer Systems Interface) bus, in which case the data is sent in the standard SCSI parallel data format. This process continues until all of the source material is sent from the electronic storage in circuit 36 to the recorder 44. Then, the operator presses a stop button. The control computer 30 ejects the tape from the library master tape drive. In the preferred embodiment, the master tape drive device is a video cassette recording means.

Figure 2:
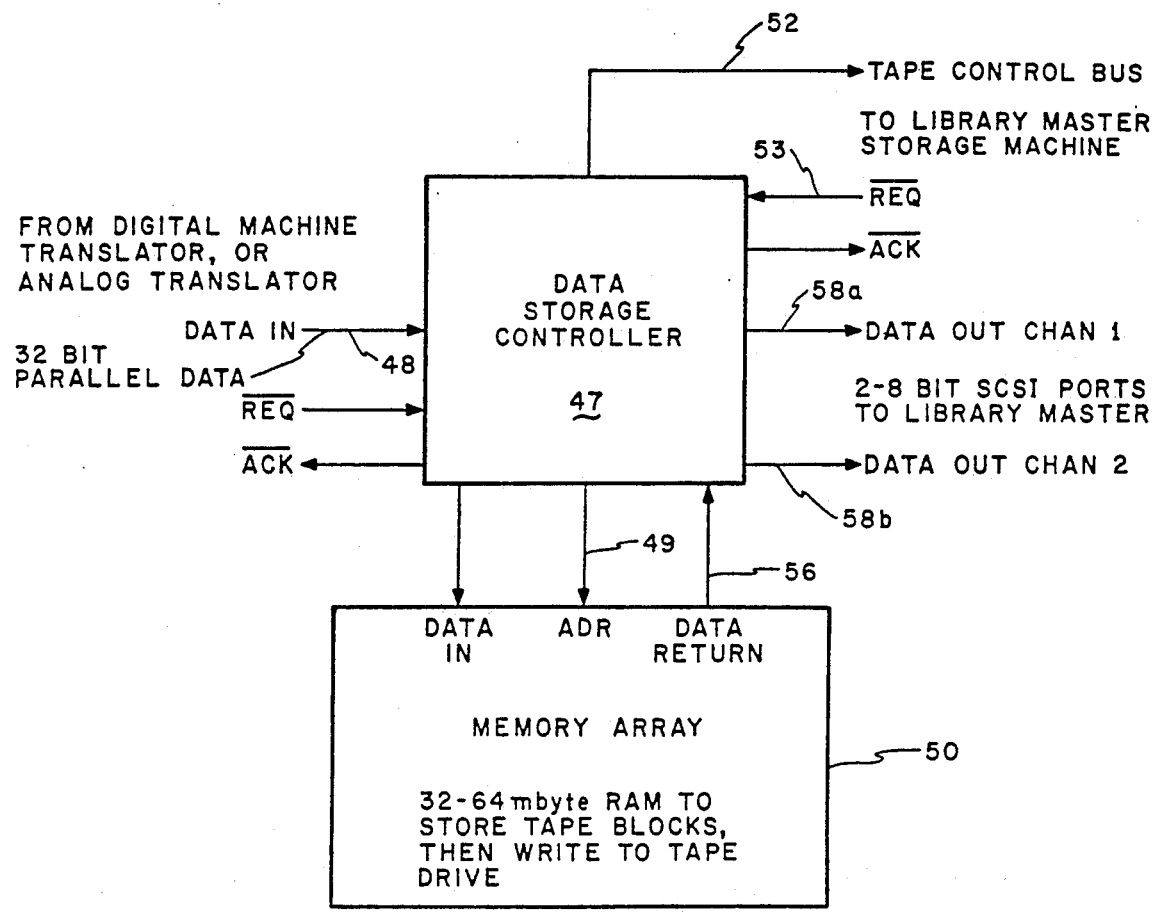
FIG. 2 is a block diagram of a buffer data storage circuit for recording library masters.

FIG. 2 shows the details of the electronic buffer memory or temporary data block storage circuit 36 for use in the mastering machine of FIG. 1. Data comes in via bus 48 to a data storage controller 47 within the buffer storage circuit. The data is parallel binary data which is sent from either the data translator 40 or the analog-to-digital converter 34. Each word of data which is sent from the translator 40 or the converter 34 is forwarded along with a storage address from controller 47 to the memory array 50.

After the memory array 50 has received a full data block, the control computer 30 sends write control codes via bus 52 to the tape drive. The tape drive then returns a request for data transmission via REQ wire 53 for starting the flow of data from data storage controller 47. Responsive thereto, an address is sent over wire 49 to the memory array 50. The data at that location is read out over the data return lines 56, 58a, 58b and sent out to the tape drive, either in parallel data form or as SCSI data packets, depending on the type of interface that is used on the tape drive. The data coming in via bus 48 from the source 32 or 38 never stops coming until the operator issues a stop command. However, the tape drive can write faster than the source material comes in so that the tape drive is automatically started and stopped to record such material without interruption.

Figure 3:
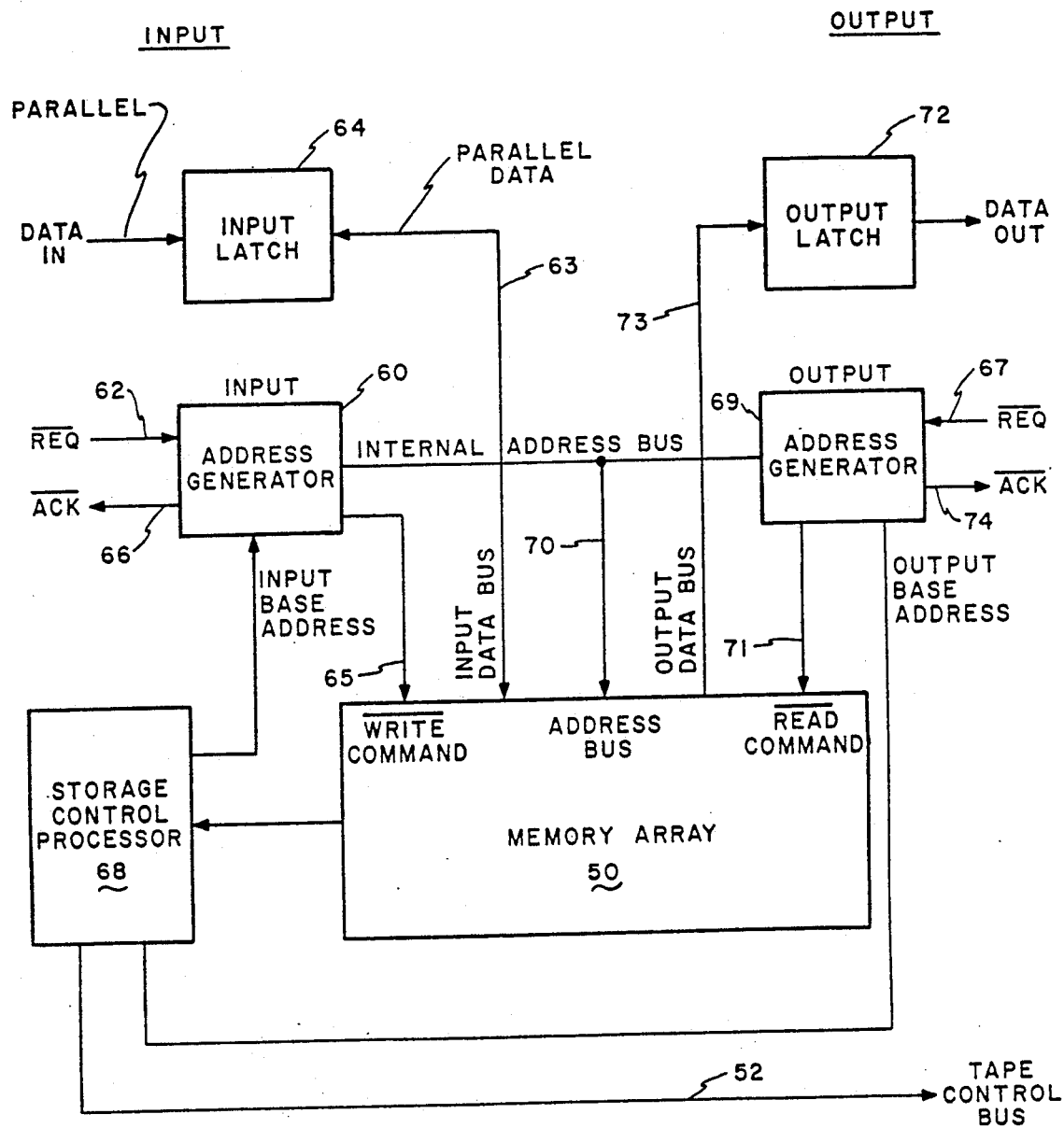
FIG. 3 is a data storage controller for the library master recorder.

FIG. 3 shows an expanded view of the data storage controller 47 for controlling the data movement into and out of the memory array 50. When the operator issues a start command, the control computer 30 (FIG. 1) sets the storage base address in the input base address generator 60. A signal on the input request ("REQ") line 62 indicates that data is available at the data input lines. The data words are then latched, one by one, in input latch circuit 64. As each data word is so latched, an address is generated by the input address generator 60. This address is then sent along with the data and a write command via buses 63, 65, 70 to the electronic memory array 50. After the write step is done, the address is incremented and an acknowledge "ACK" signal is returned on line 66 to tell the source translator 34 or 40 (FIG. 1) that the next data word can be accepted. Then, the next set of data words is latched in the input latch 64.

The control processor 68 watches as blocks of data are stored in memory array 50. When such a full block of data is ready, the control processor 68 issues a write command to the tape drive via the tape control bus 52. The control processor 68 then sets the base address in the output address generator 69 at the beginning of the current data block. The tape drive uses the output REQ conductor 67 to request data, word by word, from the storage controller 68. As data words are requested, the output address generator 69 sends an address and a read command over bus 71 to the electronic memory array 50. The data at the location within memory array 50 which is indicated by the address is then latched into the output data latch 72 via bus 73.

The storage control processor 68 then pulses the ACK line 74 to inform the tape drive that the next available data is ready. After an entire tape block has been written, the storage control processor 68 stops the tape drive and waits until the next full block is ready to write from memory. This process continues until the operator issues a stop command.

Figure 4:
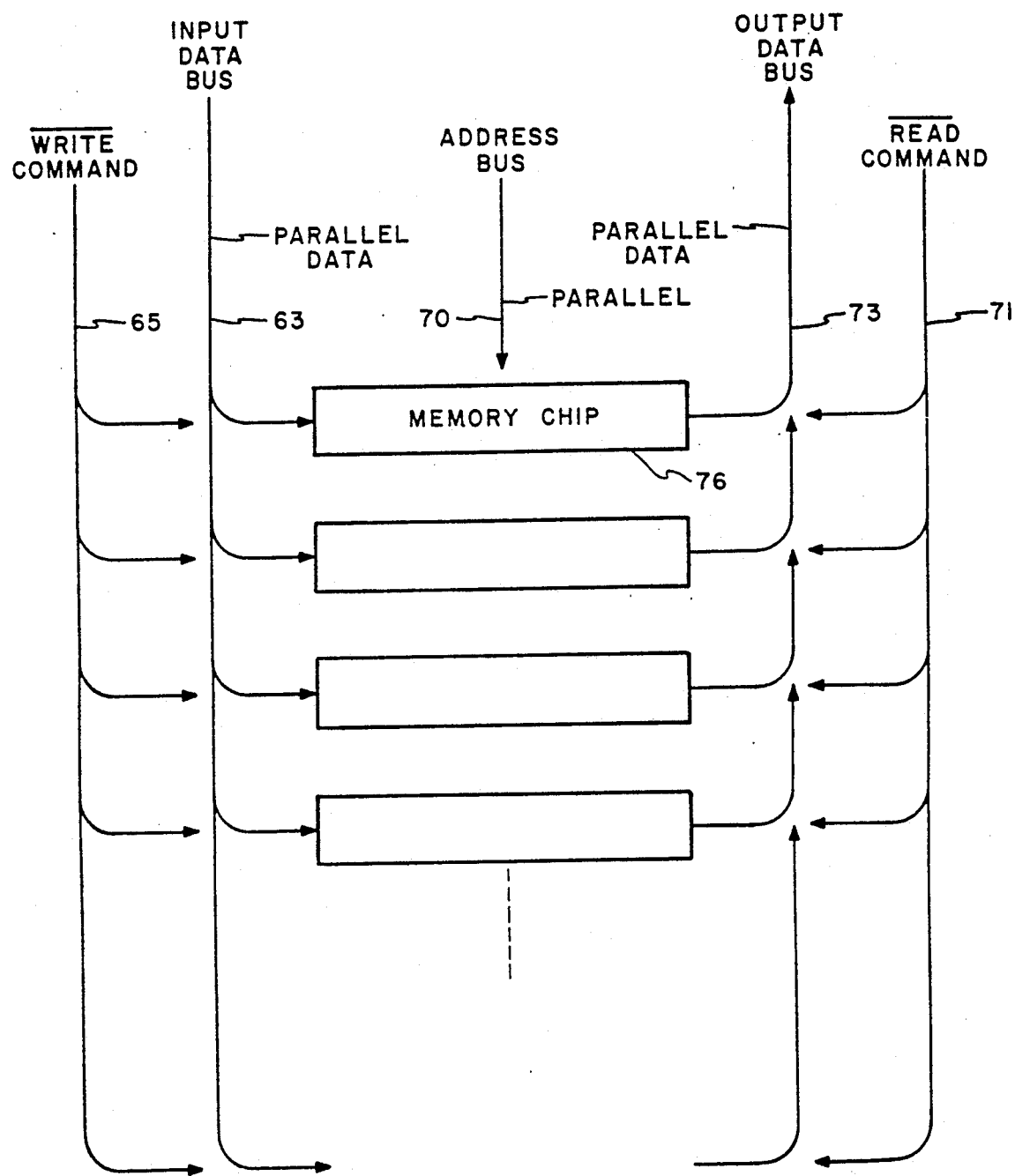
FIG. 4 is a schematic circuit diagram showing an electronic memory array for recording either a library master or a duplicate tape.

FIG. 4 shows the preferred electronic memory array 50 which may be used in either the mastering or the duplicating machine. Each of the memory chips (such as 76) has an input, all of which are connected in parallel by buses 63, 65, bus 65 carrying write commands. Likewise, each memory chip has an output, all of which are connected in parallel by bus 73. The entire array is addressed over a common address bus 70. Read commands are given over common bus 71.

Thus, the electronic memory array 50 is a single and large unitary array of memory chips 76, preferably with each of them large enough to store one million bits of information (1 Mbit chips) or optionally four millions bits of information (4 Mbit chips). These chips are manufactured by many companies including Toshiba, Samsung, Oki, etc. The inventive system would contain approximately 32–64 MegaBytes of memory, which translates into 256–512 of the chips 76. The chips are organized with the various memory areas selected when their addresses appear on the address bus 70. When a write command is issued via bus 65, the chips that are selected by the address on the address bus 70 store the information that is then present on the input data bus 63. When a read command is issued via bus 71, the chips 76 are selected by addresses on the address bus 70 in order to retrieve the information stored at that address and to present it to the output data bus 73.

Figure 5:
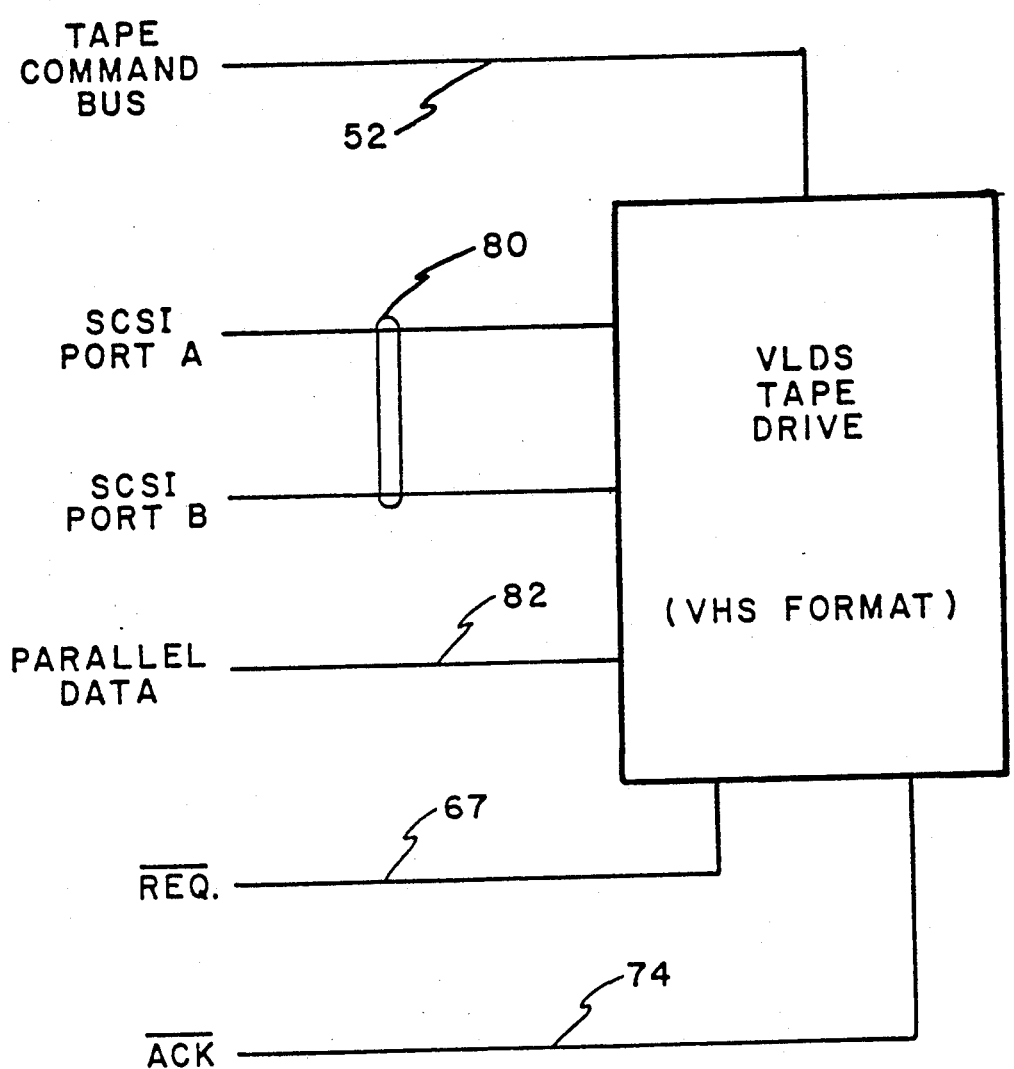
FIG. 5 shows a block diagram of a control circuit which may be applied to recorders for making either a master library or duplicate tape.

FIG. 5 shows the control buses leading to the master library recording machine or tape drive 78. It is here described as the tape drive for making a master recording on a video cassette. However, it could equally well be the tape drive for making an audio cassette. One such video tape drive is manufactured by Honeywell and is known as "VLDS" (Very Large Data Store). It is used because it accepts a tremendously fast data transfer rate. This is essential to the fast loading of the duplication line audio data. The unit can be purchased with either a Honeywell proprietary parallel data interface or optionally with a SCSI interface port. The preferred embodiment uses the SCSI port.

The storage control processor 68 (FIG. 3) may control the tape transport via the tape command bus 52 to provide the function commands including start, stop, record, play, search, rewind, etc. After a write command is issued, the drive requests data from the storage controller 47. Then, data comes in either through the SCSI ports 80 or the parallel interface 82, whichever is used. For the master library recording, the data is recorded on video tape cassettes, preferably in the VHS format.

Figure 6:
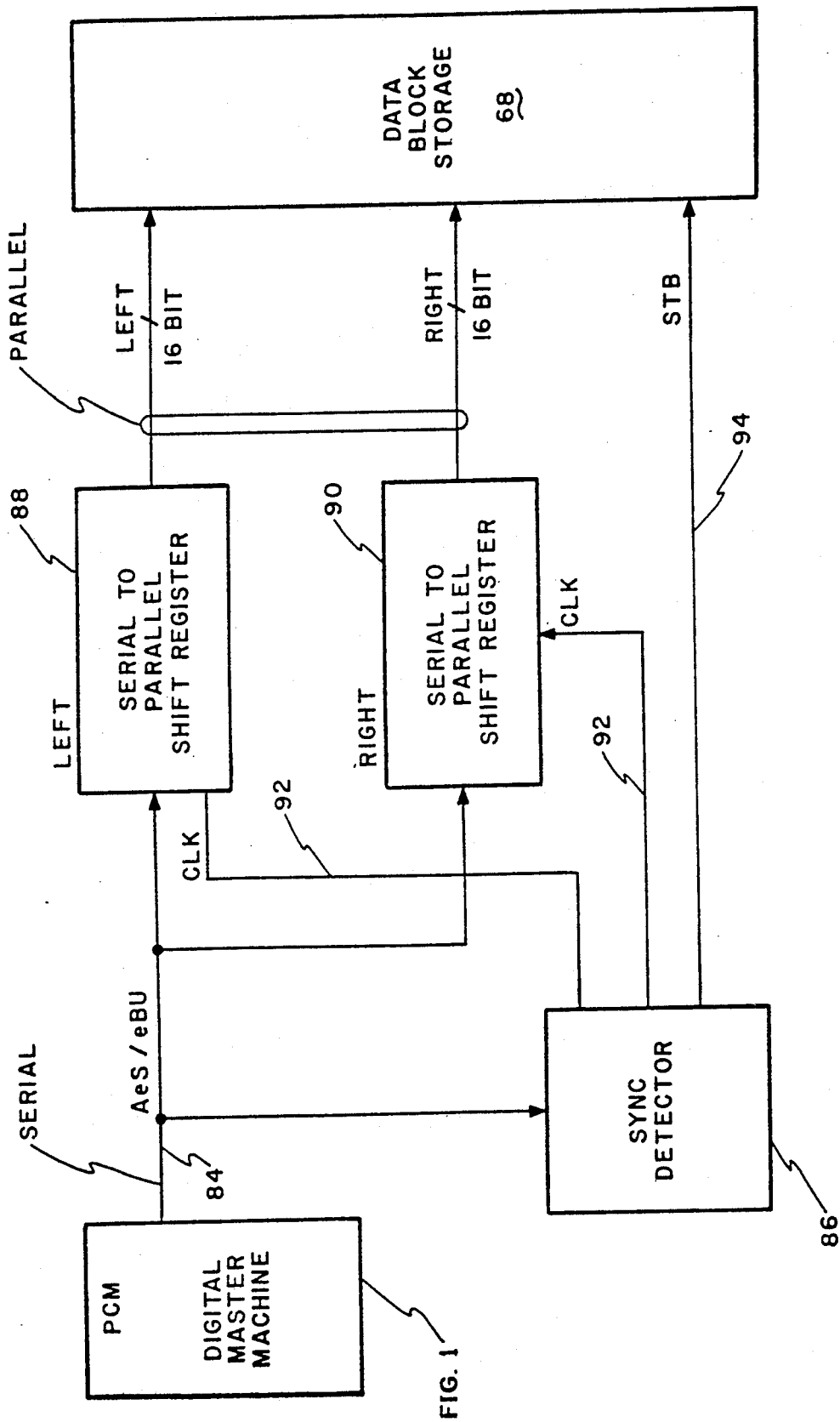
FIG. 6 is a block diagram of an interface translator.

FIG. 6 shows the details of the digital source translator 38 (FIG. 1) for the library mastering machine. This circuit translates the serial digital information that is received from the digital source device into parallel information that can be used by the library mastering system.

In greater detail, a digital master machine or a compact disc player can be fitted with an AES/EBU interface identified by the Audio Engineering Society specification SPEC# AES3-1985. This specification provides a serial data interface for digital audio equipment, and is thought to be the standard port used by most new compact disk and DAT machines. As this serial information comes in from the digital source 38 (FIG. 1) via bus 84 (FIG. 6), the sync detector 86 looks for and finds the sync bits in the data stream.

Once the sync bits are detected, the left and right channel serial to parallel shift registers 88, 90 are clocked via wires 92 to take in and convert the data stream into parallel data. After a full 16-bits of data are clocked out for left and right channels, the sync detector 86 pulses the STB line 94 to inform the storage control processor 68 that the output data is available. Then, the storage control processor 68 receives both channels of parallel data which are sent in a 16 bit format for each channel. This interchange of data continues until the sync detector 86 does not detect any more sync bits, which indicates that the digital source has been stopped by the storage control processor 68.

Figure 7:
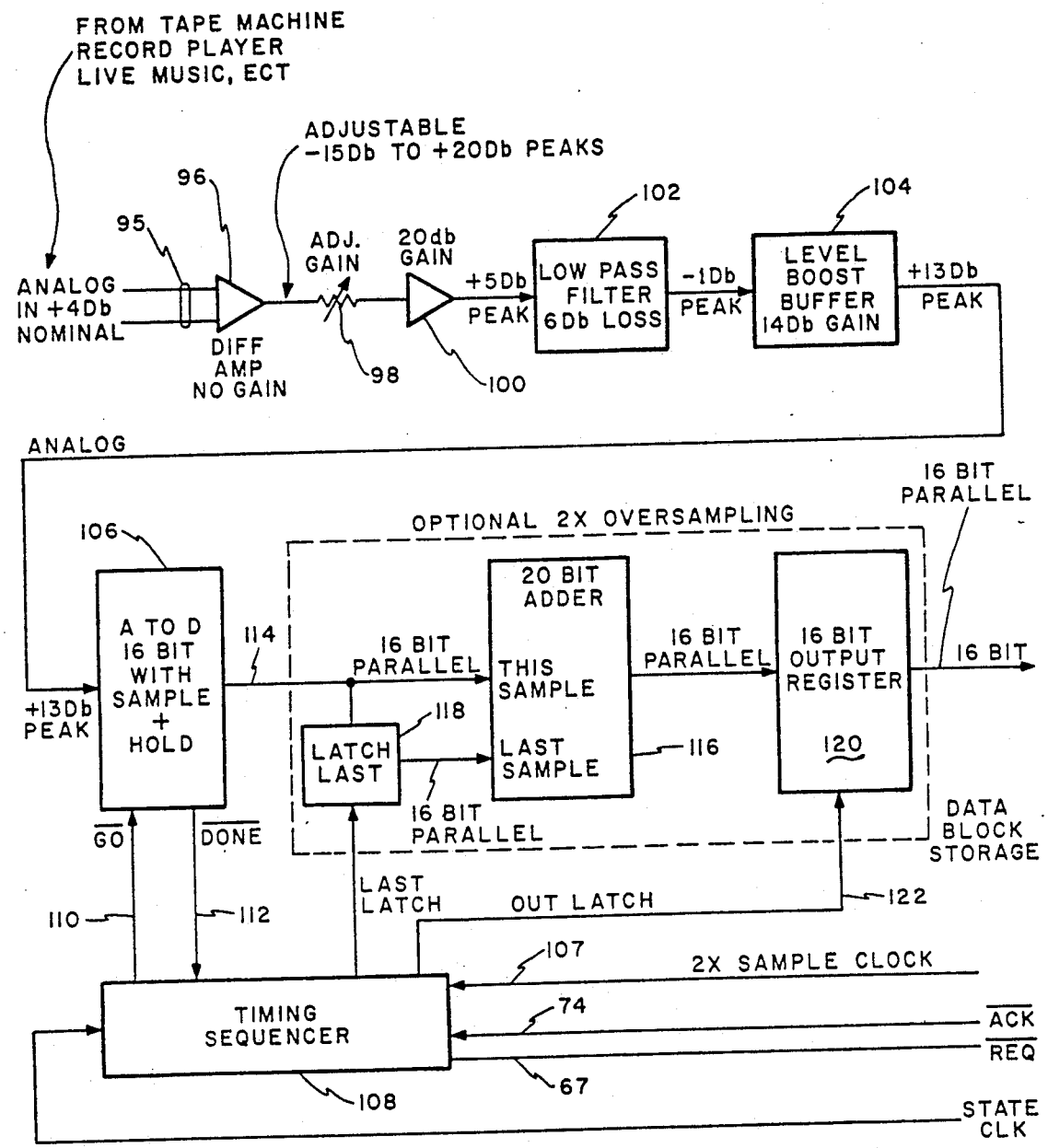
FIG. 7 is a block diagram of an analog-to-digital converter which may be used to make a library master recording.

FIG. 7 shows the detail of the analog-to-digital converter 34 (FIG. 1) for the library mastering machine. This circuit 34 converts the analog signals received from an analog source 32 into the digital information which is used internally within the system. First, an analog balanced line 95 is used as an input so that noise is reduced substantially and as much as possible. This balanced signal is added together in the differential input amplifier 96, a stage with no gain. Preferably, the amplifier 96 may be one manufactured by the John Hardy Company, of Evanston Ill., where it is known as a "Type 990" operational amplifier.

The output of the differential amplifier 96 is fed into the input gain adjust control, device 98. This gain adjustment provides adjustments which accommodate different kinds of audio equipment. The total input range of adjustments provides for a peak as low as −15 dBu (0 dBu=0.7746 vrms) or as high as +20 dBu. The output of this level adjustment stage is fed into a 20 dB gain amplification stage 100 to raise the signal level to a suitable operating level for a low pass filter 102. The amplifier 100 may also be a Type 990 from The Hardy Company. The preferred low pass filter is manufactured by the Apogee Electronics Corp., of Santa Monica, Calif., and is known as a Type-944G low pass filter. This filter removes any frequency component of the input signal that has a frequency which is higher than 22 KHz, to prevent the analog-to-digital converter from misconstruing or 'aliasing' the signal. That is, aliasing occurs if a signal is sampled at a frequency which is less than twice its cycle, which result in a misreading of the samples as a false signal of a relatively low frequency.

The output of the low pass filter 102 is then fed into a level boost buffer amplifier 104 to bring the peak information of the signal up 14 dB to the maximum input of the analog-to-digital converter, the amplifier also being preferably a Type 990 from The Hardy Company.

The output of the level boost amplifier stage 104 is fed into the analog-to-digital converter 106, which may be a device manufactured by Analog Solutions Inc., of San Jose, Calif., and known as a ZAD-2716 analog-to-digital converter. This particular type of converter is used because it is able to over-sample the analog input signal by at least two times the normal sampling rate of 44.1 KHz. A stream of 2X sample clock pulses on wire 107 goes into the timing sequencer 108, where it is sent over wire 110 to the analog-to-digital converter. When the converter 106 finishes converting the signal, it informs the timing sequencer by pulsing the DONE line 112.

The data output from the analog-to-digital converter 106 is a current sample of 16-bits of parallel data which is output onto bus 114. The timing sequencer 108 waits for adder 116 to add this sample to the last sample stored at last latch circuit 118 which was latched after the last sample. After the adding is completed, sequencer 108 then latches the resulting 16-bit addition into the output register 120 via bus 122. This addition step effectively averages the current sample with the last sample, and thus cuts out any very high frequency components of the signal. The timing sequencer 108 latches this current sample into the last sample latch circuit 118 for addition to the next following sample. Then, the timing sequencer 108 informs the storage control processor 68 (FIG. 3) that it is done or has finished by pulsing the REQ line 62 (FIG. 3). After the storage control processor has received the data, it pulses the ACK line 66 (FIG. 3).

Figure 8:
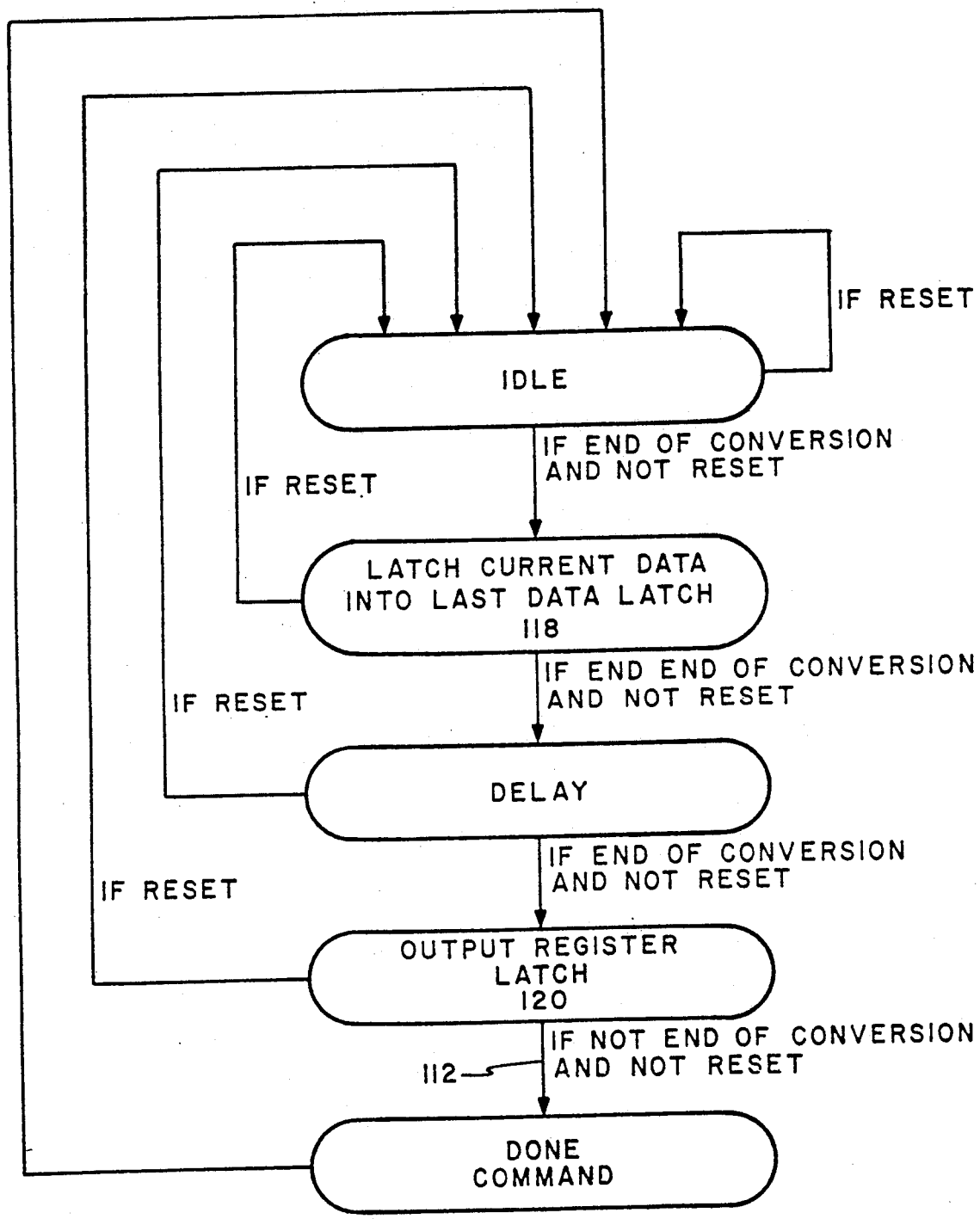
FIG. 8 is a first embodiment timing chart showing the operation of an analog-to-digital sequence.

FIG. 8 is a detailed timing diagram showing a preferred timing of the sequencer 108 (FIG. 7) and showing the sample control timing of the analog-to-digital converter 34 unit as described above. This version of system timing averages each pair of numbers into the sample data.

It is thought that this timing chart can be understood by reading the information on it. In general, until the conversion is complete, the time sequencer 108 latches the last data 118 and then an idle check is made to see if the data is still coming in from the converter 34. Next, there is a delay which allows a data word to be received, again followed by an idle check to determine whether data is still coming in. The data is latched into output register 120 and once more an idle check is made to see if data is still coming in. Then, a DONE command is given via wire 112 following which an idle check is made. If any of these idle checks test positively to indicate that data is no longer coming, in there is a general reset.

Figure 9:
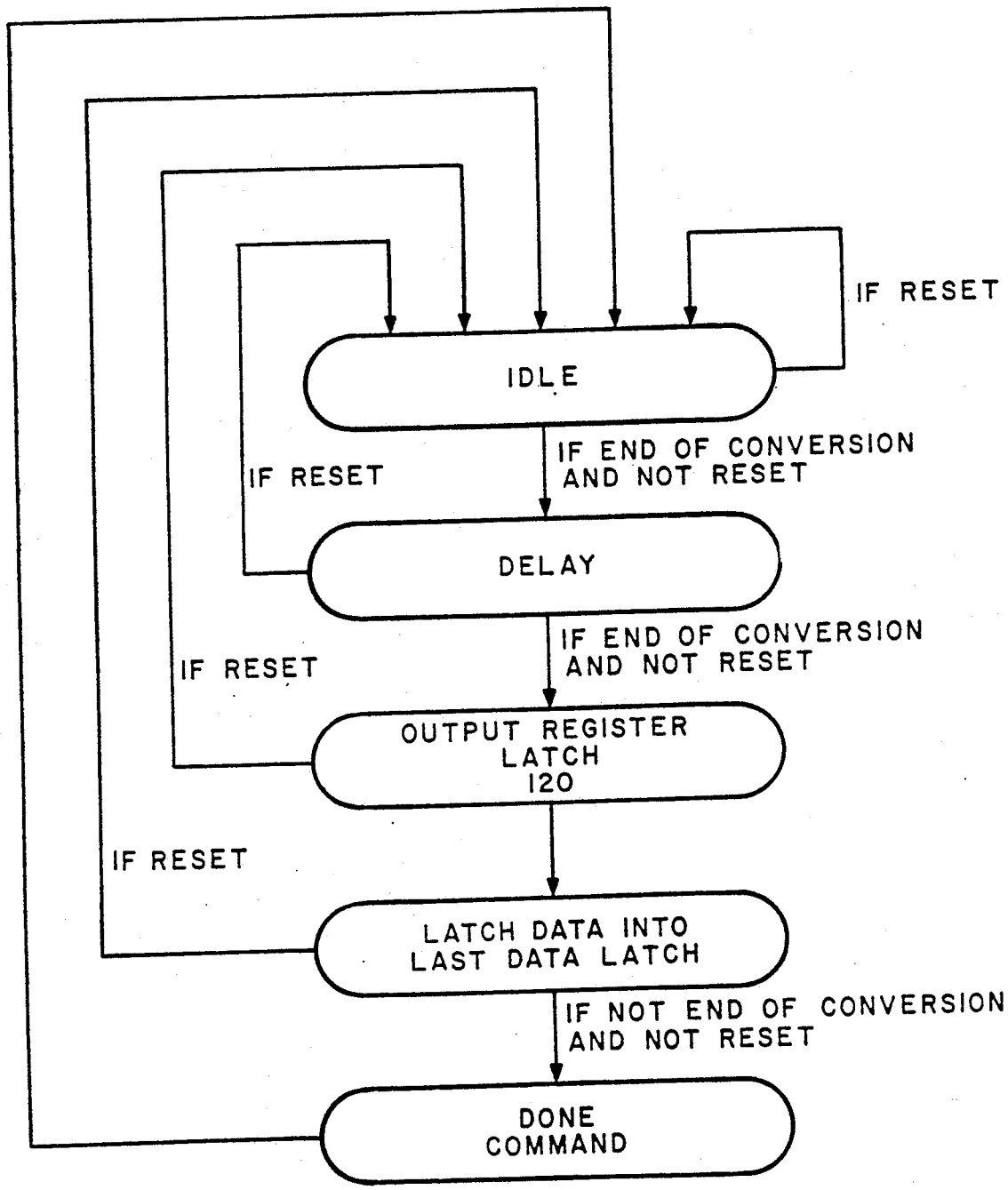
FIG. 9 is a second embodiment timing chart showing the operation of another analog-to-digital sequence.

FIG. 9 shows an alternate detailed timing diagram for the timing sequencer 108 which may be used for the sample control timing of the analog-to-digital converter 34 unit. This version averages the present sample with the last sample, and continuously slides the samples down one sample period.

The principal differences between the timing of FIGS. 8, 9 is that the FIG. 9 timing delay extends directly to the step of the output register 120 without the intermediate check over the last data latch. In FIG. 9, the last data latch is checked after the end of the output register check.

Figure 10:
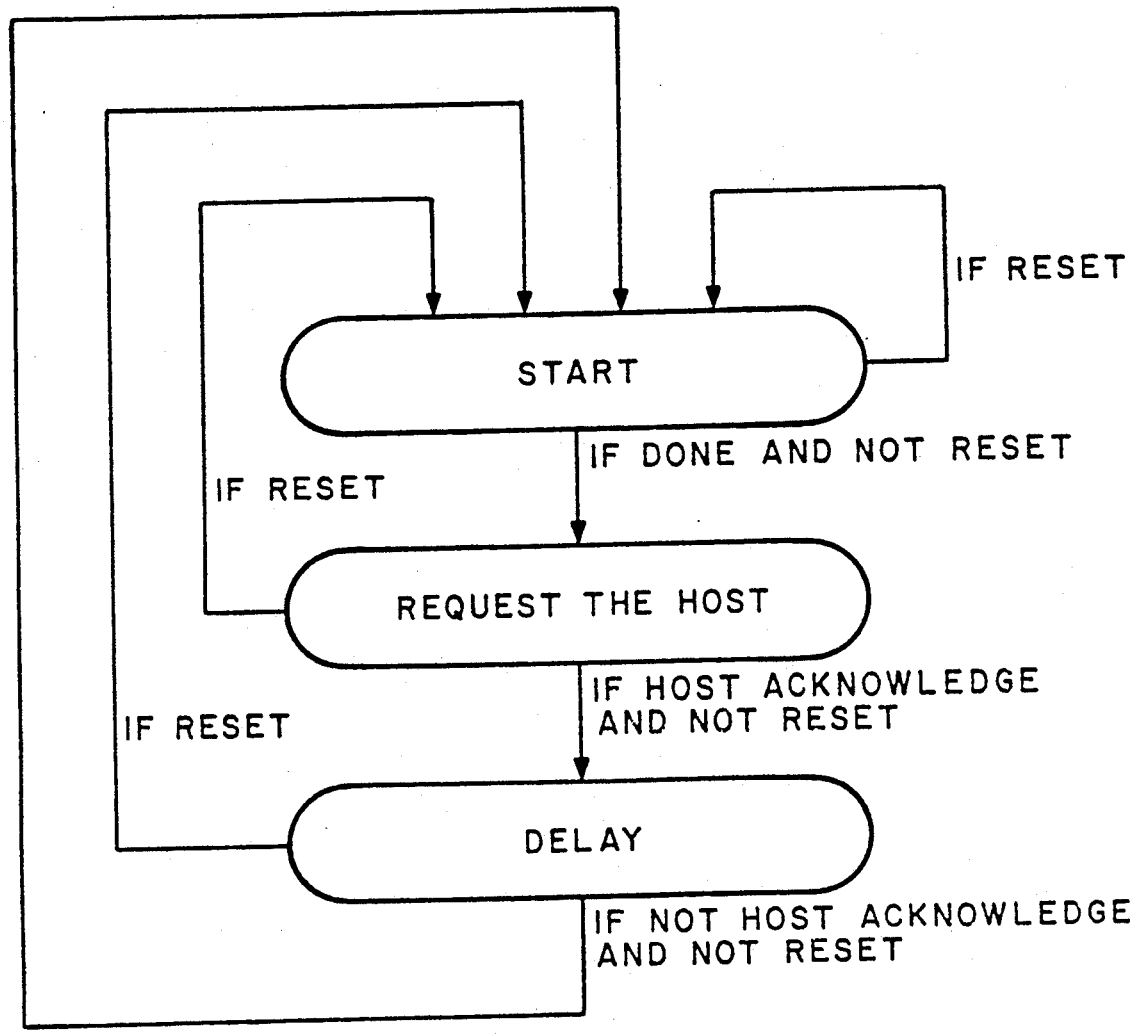
FIG. 10 is a timing chart showing the input/output timing of an analog-to-digital converter.

FIG. 10 is a detailed timing diagram showing the timing sequence for the host input/output control timing of the analog-to-digital converter 34 unit. In greater detail, the sequencer simply requests the input of data, measures a time period during which a conversion is made and then requests the input of more data. Idle checks are made after each step to see if data is still coming in. A general reset is made whenever it is found that there is no incoming data.

Figure 11:
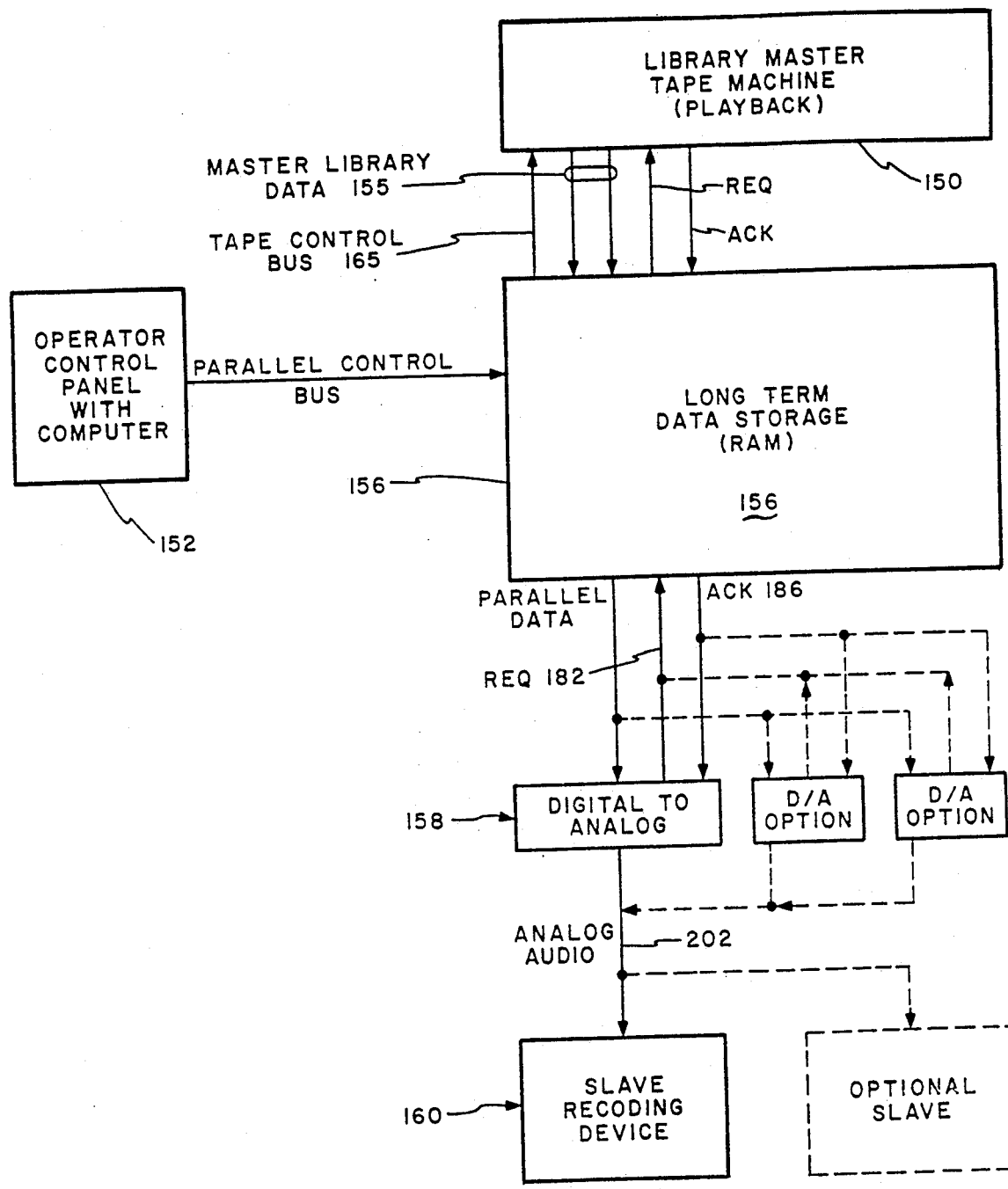
FIG. 11 is a block diagram showing a control circuit of a recorder for making duplicated tapes.

FIG. 11 shows the overall block diagram of the duplication machine. This machine receives the data which was stored on video tape cassettes by the machine of FIGS. 1-10 and converts such stored data into information which is stored on audio tape cassettes or the like and which may be duplicated once or hundreds or thousands of times without having to re-read the video cassette.

In greater detail, the operator first loads the library master tape into a tape drive 150 (which may be the same as FIG. 5) in the duplication machine, and then initiates a load sequence via the control panel and computer 152. The control computer 152 then attempts to read the tape in the tape drive 150. A single master tape usually contains several duplicate copies of the source material, so that if an error occurs while the machine is reading the present section of the tape, the error will be found by comparing the next readout with the data that was stored during the last read out. Thus, errors in stored data are detected when the data which is read out from the tape is compared with the data which is found when the tape is advanced to read out the same data on the next available section of tape.

The data arrives via bus 155 in a parallel form and is stored into long term electronic data storage memory 156, and is sequentially stored in location after location until the end of the present tape data segment. After all data has been read, the tape in the video cassette can be rewound. The cassette is ejected from the tape drive.

The control panel 152 now displays all current machine setup parameters such as cue tone frequency, cue tone length, cut tone placement, elapsed time between copies, total tape elapsed time, and duplication speed. The cue tone is used to mark the end of one copy and the beginning of the next copy, so that when the pancakes are loaded into cassette shells, the end of one copy and the beginning of the next copy can be determined. If any of these parameters need to be changed, the operator enters the correct value on panel 152.

The operator starts the machine by pressing a suitable start button (not shown) on control panel 152. Displays on the control panel show present tape time, total number of copied selections, cue tone information, machine duplication speed ratio, and other vital statistics. At the start of this sequence, the control computer sets a start address which identifies both the data and the total length of the data which is to be read out during the duplication recording of the program material onto an audio tape cassette.

Data is read out of the long term electronic data storage memory 156, one data word after another, in a parallel data format. This parallel data is sent to digital-to-analog converter 158 where it is converted into an analog signal. There is one converter 158 for each channel or slave recording device 160. This read out data flows at a speed that is proportional to the duplication speed, which is usually substantially faster than real time. The converted analog signals go to the slave recording devices where they are put onto tape, film, disc, or whatever recording media is being used.

This process continues until the end of the source material is reached, at which time a cue tone is generated. When the cue tone is finished, a control processor in panel 152 resets to the start address of the source material which is reproduced again. This procedure continues until the operator stops the machine, or until all slaves 160 are out of tape.

To help increase production, the operation of the slave transports can be staggered so that all do not run out of tape at the same time. For example, slave transport #1 will be making, say, copy 5 while slave transport #2 is making copy 12. This way, the operator can be placing a new reel of tape in the transport of slave recorder #1 while all other slaves are running. Then, a few minutes later, the operator can place a new reel of tape in the transport of slave #2. The machine aids the operator by starting the transportation of a freshly loaded slave at the correct time so that it is up to speed when the master starts reading out its next round of source material.

A major advantage of the inventive system is that once the master has been put into electronic storage, it may run indefinitely at any speed, with no further wear on the library master source. The library master tape is read only once during a duplication run while the data stored in the electronic memory is non-destructively read out many times. The master tape in the video cassette is removed and placed on the shelf.

Figure 12:
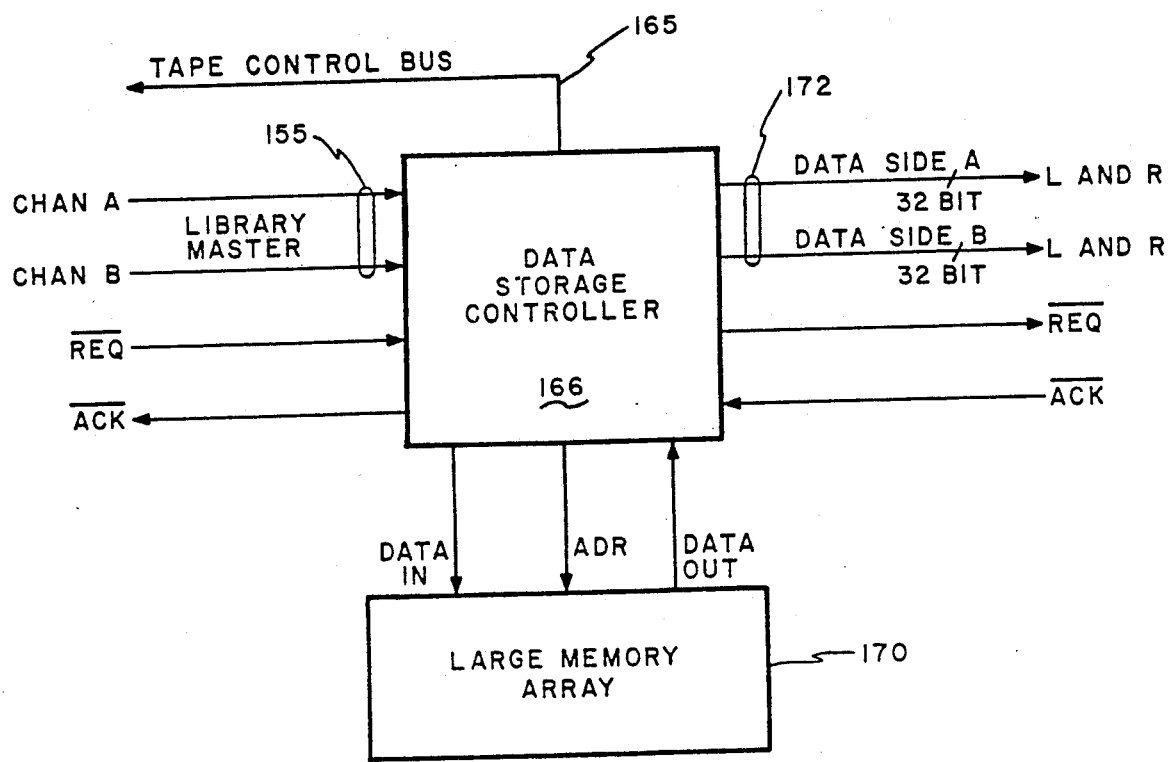
FIG. 12 is a block diagram of a circuit for playing back data from electronic memory storage.

FIG. 12 shows the details of the duplication machine's long term data storage circuit. The tape drive (same as FIG. 5) is started when the operator initiates a tape load command. Then, via wire 165, the tape drive requests service from the storage controller 166. The storage controller reads the data from the video cassette in drive 150 (FIG. 11), which data arrives via wires 155, either in parallel data form or as SCSI data packets, depending on the interface used on the tape drive. The data is sent along with an address into the memory array 170 where it is stored at a selected location identified by such address. After the electronic memory array 170 (which may be the same as FIG. 4) has received the complete data that is read out of the video cassette tape, a control computer in controller 166 determines the ending location of the master material. The data coming in from the tape drive never stops coming until the end of tape data has been reached. When the output of the data is started to the slave transports, the data is read out of the electronic memory array 170 through the storage controller 166 and bus 172 to the analog-to-digital converters in a parallel data form.

Since the data is electronically stored at 170, the memory storage may be read out either way, from beginning to end or from end to beginning. Therefore, all audio channels on both the A side and the B side of the audio tape may be read out simultaneously via wires 172. The A side signals are read out and recorded from beginning to end and the B side signals are simultaneously read out and recorded from end to beginning.

Figure 13:
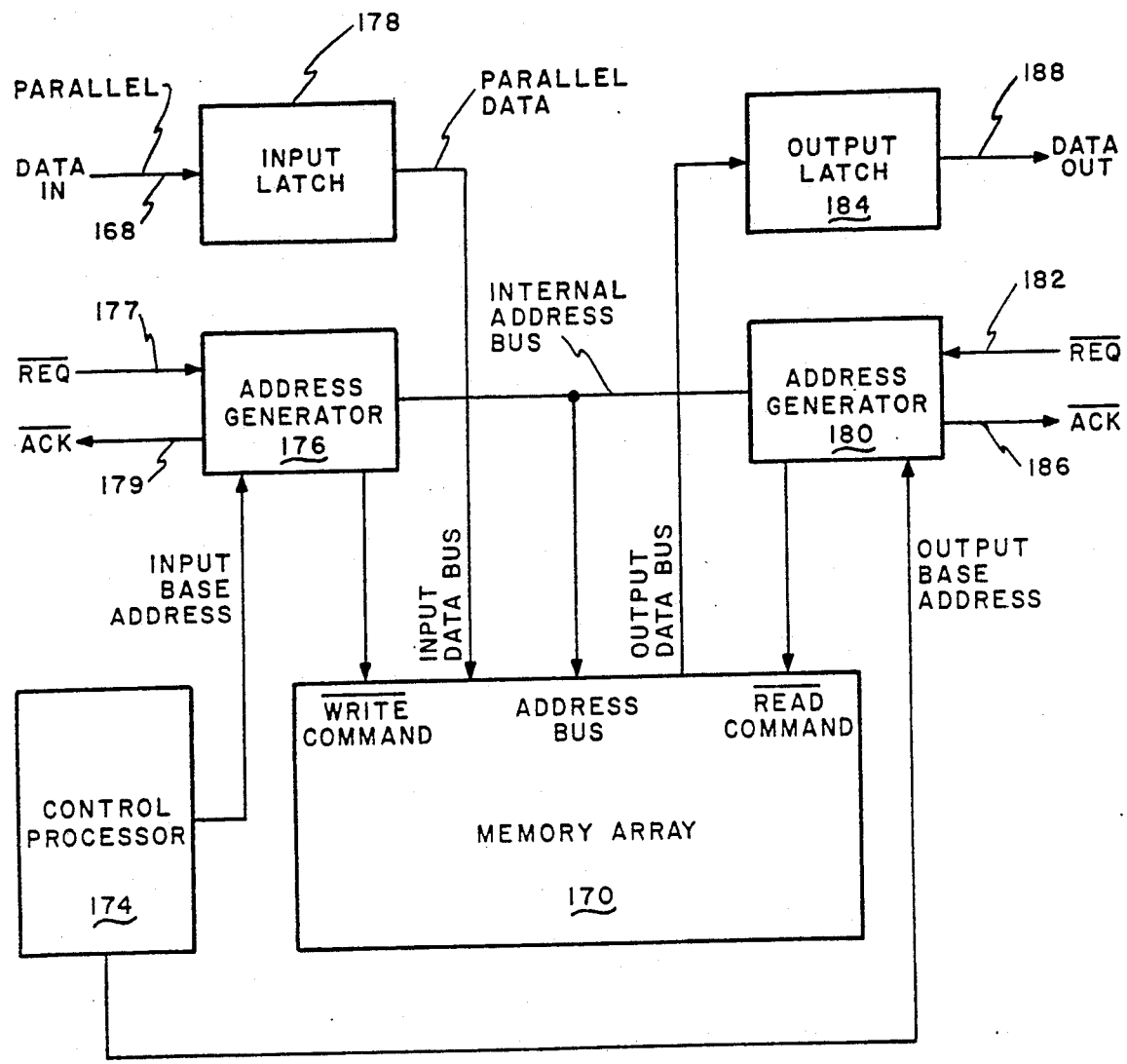
FIG. 13 is a block diagram which shows a circuit for controlling an electronic memory data storage array.

FIG. 13 shows, in greater detail, the data storage controller 166 for the duplicating machine. When the operator issues the tape read command, the control processor 174 sets the storage base address in the input base address generator 176. The input REQ line 177 is marked to indicate that data is available on the data input lines 168. The data words are then latched one by one in the input latch circuit 178. As each data word is so latched, an address is generated by the input address generator 176. This address is then sent along with the data and a write command to the memory array 170. After the writing is done, the address is incremented in generator 176. An acknowledgement signal is returned on the ACK line 179 to tell the tape drive that the next data word can be accepted. The next set of data words is sent from the tape drive and is latched into the input latch circuit 178. This sequence of data transfer continues until the entire cycle of data has been read from the video cassette and recorded in electronic memory array 170.

When the operator starts the output duplication cycle, the control processor 174 sets the base address into the output address generator 180, at the beginning of the source material data. The analog-to-digital converters 158 (FIG. 11) then use the REQ line 182 to request data to be sent, word by word, from the storage controller 166 (FIGS. 12, 13). As each of the data words are requested, the address generator 180 sends an address and a read command to the electronic memory array 170. The data in memory 170 which is at the location selected by the address is then latched into the output data latch circuit 184. The processor 174 in storage controller 166 informs the analog-to-digital converters 158 (FIG. 11) of the available data by pulsing the ACK line 186. After an entire cycle of source material has been written into the duplicate tape, the control processor 174 resets the base address generator 180 to the beginning address of the source data. Another duplication cycle is performed. This process continues until the operator issues a stop command.

The electronic memory array 170 (FIG. 13) is substantially the same as the array shown in FIG. 4. However, the array shown in FIG. 4 is usually large enough to store a single selection of information that is being assembled and recorded on a video tape cassette. Each selection may be added as an independent unit of data that is recorded on the master tape as it becomes available. The electronic memory array in memory 170 of FIG. 13 is large enough to store an entire album as it is read off the library master tape. Thus, the electronic memory array storage 50 (FIG. 2) in the mastering machine may be in the order of 256-512 1M bit chips, while the electronic memory array 170 (FIG. 13) in the duplicating machine may have a memory containing in the order of 4,000-4,250 chips in order to store an entire album (about 45 minutes of recorded time).

The duplication machine has a control drive circuit which is substantially the same as the drive shown in FIG. 5.

Figure 14:
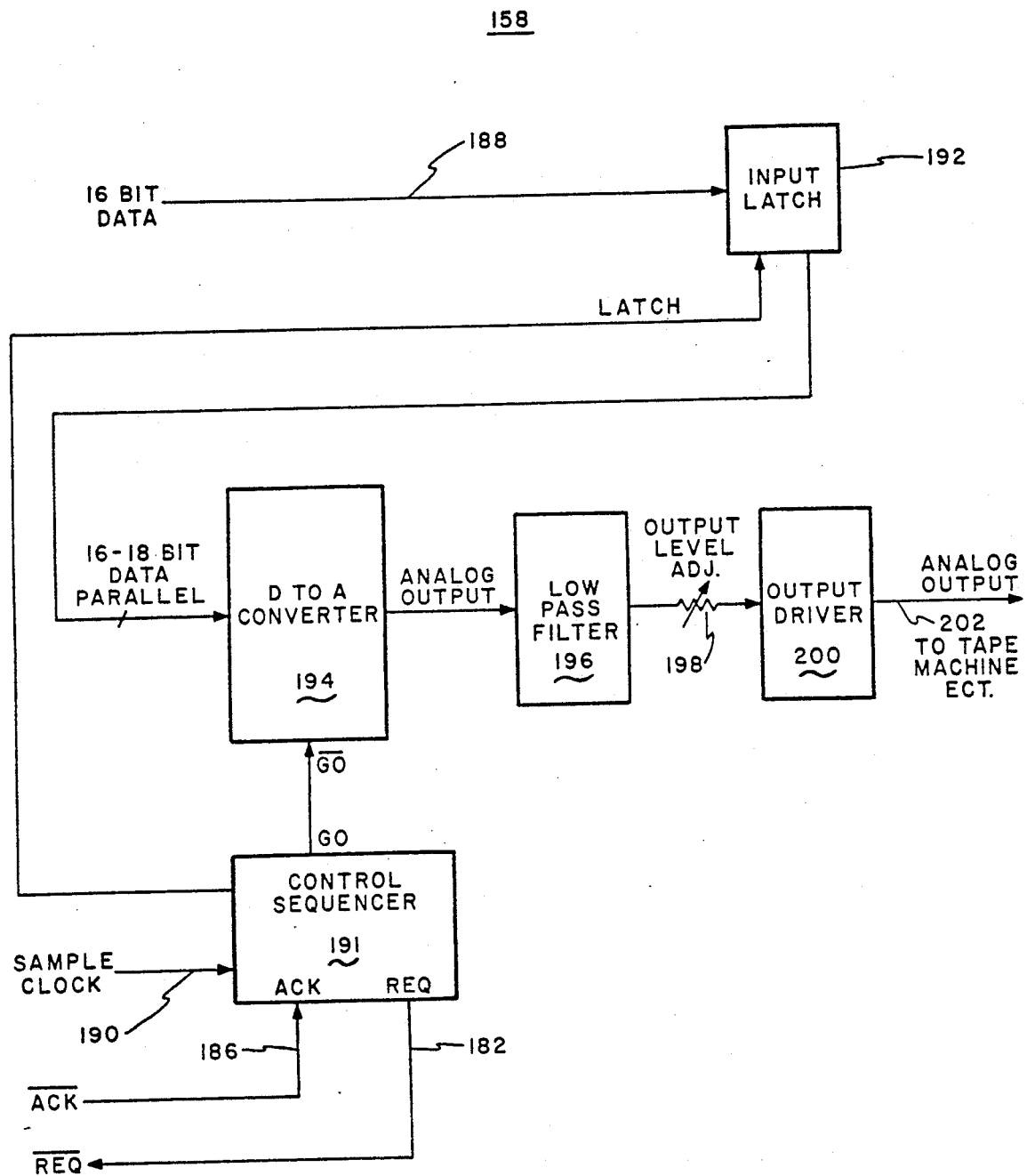
FIG. 14 is a block diagram for a digital-to-analog converter.

FIG. 14 provides the details of one of the digital to analog converters 158. The sample clock rate is set by clock pulses appearing on line 190, at a cyclic repetition rate which is set by the desired converter output speed. For example, if a sampling clock rate of 44.1 KHz is used, there is a 1:1 duplication ratio. A sampling clock rate of 88.2 KHz is equal to a 2:1 duplication ratio, etc. Other clock rates lead to other duplication ratios. As each sample clock pulse comes in on line 190, the control sequencer 191 pulses the REQ line 182 to inform the storage controller 166 (FIG. 13) that it needs more data. When the data is present on the parallel digital inputs 188 (FIG. 14), the storage controller 166 pulses the ACK line 186 to inform the control sequencer 191 that the data is valid. The control sequencer 191 then latches the data into the input latch circuit 192. Once the data has stabilized in the input latch circuit 192, it proceeds into the digital-to-analog converter 194, as parallel data.

When all of the data has arrived, the control sequencer 191 pulsing a digital GO pin to tell the digital-to-analog converter 194 to convert the data into an analog form. The converter 194 then converts the digital data to an analog signal which proceeds into the low pass filter 196 which is used to remove or smooth out the "stair-step" effect in the output which is created by the digital-to-analog converter. If no low pass filter is used, the analog output would have extra high frequency noise caused by the stair-step effect that could potentially conflict with the bias that is used to record the signal onto the slave tape recorders.

The signal that emerges from the low pass filter 196 goes to an adjustable output level control circuit 198 to adjust the signal level so that different types of slave recording machines can be accommodated. This level control circuit feeds an output driver 200 that is used to drive the very high frequency signal onto the cables 202 that go to the slave recording devices 160 (FIG. 11).

Figure 15:
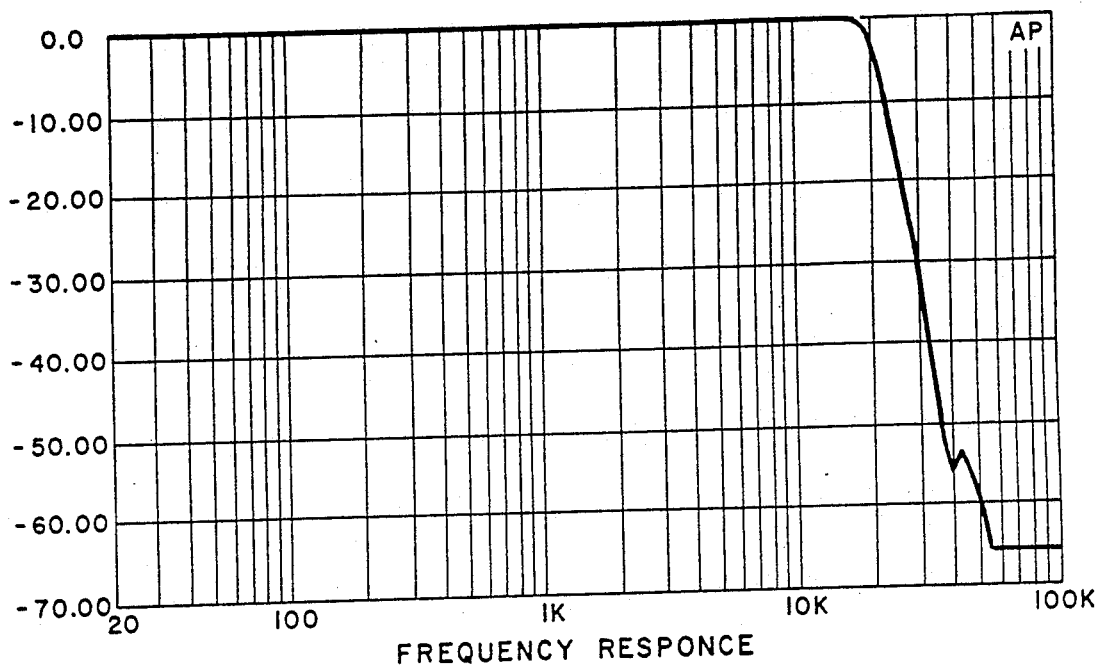
FIG. 15 is a graph showing the frequency response curve of the inventive system.

FIG. 15 gives an example of a desired frequency response for the low pass filter 196, based on the sample rate. If the sample rate is 1 Mhz, then the roll-off has to be completed before one-half the sample rate, or in this case, 500 KHz. As can be seen from this example, a different low pass filter 196 is selected for each different slave tape speed.

Figure 16:
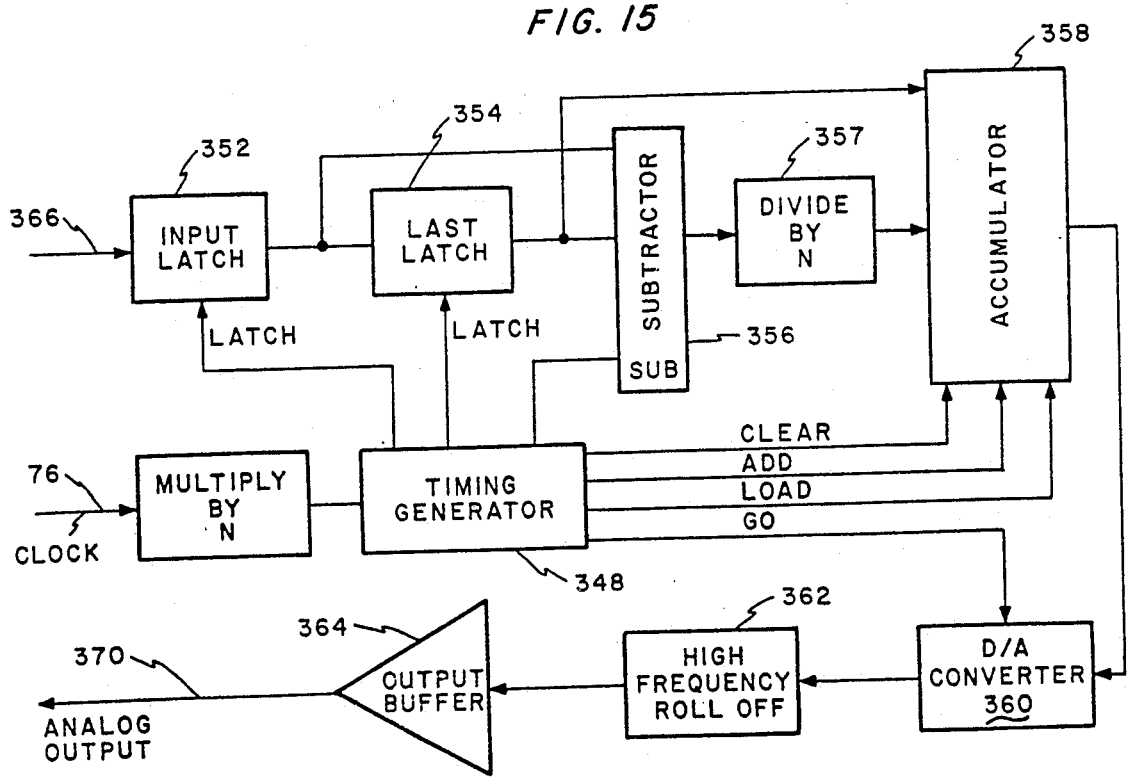
FIG. 16 is a digital-to-analog converter for calculating a higher quality analog curve.
Figure 17:
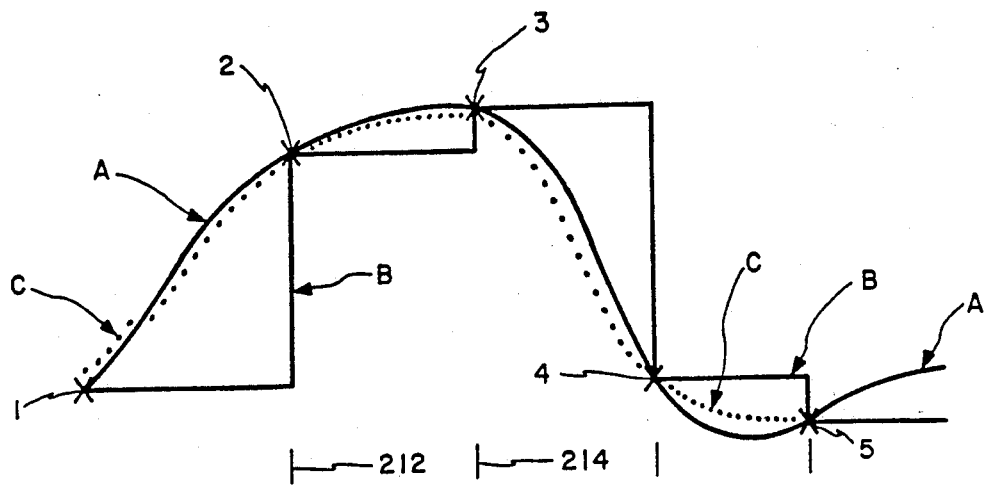
FIG. 17 is a graph explaining the response characteristics of the digital-to-analog converter of FIG. 16.

An alternative circuit (FIG. 16) for converting the digital information into analog information provides a great improvement since it eliminates a need for customized filtering. The method of this digital-to-analog converting mathematically calculates the appropriate analog samples in order to create a relatively smooth curve so that low pass filtering is not required. FIGS. 16, 17 are substantially the same as FIGS. 18, 19 in my above-identified prior application.

In greater detail, this digital-to-analog converter uses mathematics to create multiple samples for each of the stored samples. For example, if there are 44,100 samples which are stored each second, there is a roll off of the high frequency noise above 22.5 KHz which avoids noise and distortion problems. If mathematics is used to create four samples for each of the available ones, the roll-off frequency increases to 88.1 KHz. This technique effectively removes the complex low-pass filter from the digital-to-analog unit, and gives the freedom required to run the recording output at any speed factor or duplication ratio, without requiring any change in the output filter.

In essence, the higher the over-sampling frequency, the better the circuit. In a system that uses only one standard speed, it is not as important to use a high over-sample value. For example, if a sample factor of four is used, the high frequency is easy to filter off, because one constant speed factor is used. Ideally, however, the sampling speed factor should be adjustable so that any of many sampling speed factors may be used. The invention provides such adjustability since the clock speed of the circuit shown in FIG. 16 can be easily changed by using a programmable divider 357 a and b for changing the timing of the timing generator 348.

The circuit of FIG. 16 operates this way. Data comes in over a parallel data bus 366, and is latched into input latch circuit 352. The subtractor 356 then determines the difference between this current sample stored in latch circuit 352 and the last previous sample that is stored in last latch circuit 354. The difference between the two samples is then divided at 357b by the over-sample rate factor 'N' (4, 8, 16, 32, etc.). The accumulator 358 repeatedly adds the divided difference onto the last sample in order to increment its value and thereby create N small steps between any two successive samples. Each of these added samples is then sent out of the accumulator 358 and on into the digital-to-analog converter 360, one sample being added for each of the over sample factors. The digital converter 360 then converts the sample into an analog signal that goes into a very slightly high frequency roll off filter 362 to prevent an RF pickup. This new analog signal is then run through an output buffer 364 to drive the slave recording devices via analog output 370.

The improvement can be seen in FIG. 17, which shows a comparison of an ideal analog signal (solid line A), a standard non-over sampled signal (stepped solid line B), and an over-sampled signal with a factor of 16 (dotted line C). The ideal signal (A) is a very smooth curve which is representative of the original curve. The standard non-over-sampled, stair-step signal (B) had very hard/sharp edges which are basically high frequency components that need to be removed in order to make the signal look more like the curve (A). The sixteen over-sampled signals (C) in each sample period (the horizontal flat lines in curve B) can be seen as a dramatic improvement over the non-over-sampled signal (B). Basically, the over-sampled signal (C) is comprised of four times sixteen very small steps as opposed to the one original sample signal (B) which has four very large steps (in the illustrated curve of FIG. 17)

The curve (C) limits the high frequency component of the signal and removes the need for a steep roll-off filter.

Figure 18:
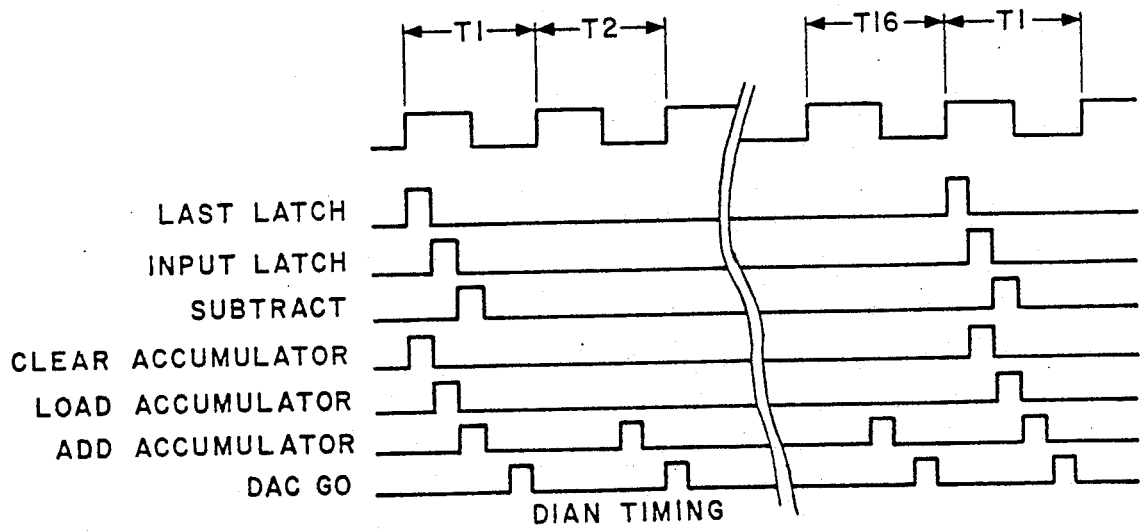
FIG. 18 is a timing chart for the converter of FIG. 16.

FIG. 18, which is also taken from my previous application, shows the timing required for an over-sample factor of sixteen. This same timing in a slightly altered form may be used for any other over-sample factor.

Those who are skilled in the art will readily perceive how to modify the invention. Therefore, the appended claims are to be construed to cover all equivalent structures which fall within the true scope and spirit of the invention.

I claim:
1. A duplicating recorder/reproducer system for duplicating pre-recorded material on magnetic tape having a first side A and a second side B, side A and side B being recorded so that sides A and B can later be played back by moving the magnetic tape in opposite directions, comprising,
    (a) means for supplying audio source signals in a digital form,
    (b) means responsive to said electronically stored source signals for making a single master library recording of said digital source signals, said master library recording containing information for both sides A and B,
    (c) means for generating master library signals from said master library recording by playing back at least a portion of said master library recording, said signal generating means having a single playback apparatus,
    (d) storage means responsive to said playback of at least a portion of said master library recording for electronically storing selected digital signals from said master library recording which include both side A and side B,
    (e) said storage means having a unitary large scale electronic memory which stores all of said selected master library signals in volatile memory, and
    (f) duplicating means responsive to said electronically stored master library signals for making a plurality of duplicate recordings without requiring any further playback of said master library recording while said signals remain in said storage means, said duplicating means simultaneously reproducing sides A and B so that both side A and side B can be recorded in opposite directions on the magnetic tape by a slave recorder in a single pass,
    whereby a plurality of duplicate tape recordings having two sides of material recorded for playback in opposite directions may be made from signals in said storage means, without requiring any mechanical moving parts in said storage means.

2. The system of claim 1 wherein said means for making said master library recording comprises means for recording said digital signals in said electronically stored source signals on a video tape cassette.

3. The system of claim 1 wherein said duplicating means comprises an digital to analog converter for making the duplicate recordings in an analog format.

4. A method for duplicating pre-recorded material on magnetic tape having a first side A and a second side B, side A and side B being recorded so that sides A and B can later be played back by moving the magnetic tape in opposite directions, comprising the steps of:
    (a) supplying audio source signals in a digital form,
    (b) making a single master library recording of said digital source signals, said master library recording containing information for both sides A and B,
    (c) generating master library signals from said master library recording by playing back at least a portion of said master library recording from a single playback apparatus,
    (d) electronically storing selected digital signals from said master library recording which include both side A and side B in a unitary large scale electronic memory which stores all of said selected mater library signals in volatile memory,
    (e) making a plurality of duplicate recordings without requiring any further playback of said master library recording while said signals remain stored in said volatile memory, (f) making the duplicate recordings by simultaneously reproducing sides A and B, and (g) recording both side A and side B on the magnetic tape in opposite directions in a single pass using a slave recorder, whereby a plurality of duplicate tape recordings having two sides of material recorded for playback in opposite directions may be made from electronically stored signals, without requiring any mechanical moving parts in said volatile memory.

5. The method of claim 4 comprising the step of recording said digital signals in said electronically stored source signals on a video tape cassette.

6. The system of claim 4 comprising the steps of converting the stored digital signals into analog signals and making the duplicate recordings in an analog format.

7. A duplicating recorder/reproducer system comprising means for supplying source signals in a digital form, said means for supplying source signals including an analog-to-digital converter and a digital translator with switch means for selecting between said converter and said translator, a time sequencing means for controlling said analog-to-digital converter, said sequencing means cyclically operating through the steps of:

(a) converting said source signals into the form of successive data words;

(b) latching a current source signal data word into a last data word latch circuit for use in connection with the next received source signal data word;

(c) outputting a signal which is a combination of said current source signal data word and a stored last previous source signal data word;

(d) continuously checking the signals to determine whether said source signals continue to be received by said analog-to-digital converter; and (e) resetting at least part of said analog-to-digital converter to an idle condition in response to a finding in step (d) that said source signals are not being received by said analog-to-digital converter, means responsive to said digital source signals for electronically storing said digital source signals, means responsive to said electronically stored source signals for making a master library recording of said digital signals, said means for making said master library recording including means for recording said digital signals in said electronically stored source signals on a video tape cassette, means responsive to a playback of said master library recording for electronically storing the digital signals played back from said master library recording, said electronic storage means having an array of large scale memory chips, each of said chips being capable of storing at least 1 Mbit of information, each of said chips having an input port and an output port, all of said input ports being connected in parallel and all of said output ports being connected in parallel, and means responsive to addresses transmitted into said array on an address bus common to all of said chips for selecting between said input ports and said output ports, so that the entire array of memory chips behaves as a single and unitary large scale electronic memory, and means responsive to said electronically stored master library signals played back from said master recording for making duplicate recordings, whereby a plurality of duplicate recordings may be made from signals in said electronic storage without requiring any mechanical moving parts or any further playback of said master library recording while said signals remain in said electronic storage.

8. The system of claim 7 wherein said time sequencing means introduces a delay between steps (b) and (c) which is long enough for said analog-to-digital converter to process said combination of said current and said last data words.

9. A duplicating recorder/reproducer system comprising means for supplying source signals in a digital form, said means for supplying source signals including an analog-to-digital converter and a digital translator with switch means for selecting between said converter and said translator, a timing sequencing means for controlling said analog-to-digital converter, said sequencing means cyclically operating through the steps of:

(a) converting said source signals into the form of successive data words;

(b) outputting a signal which is a combination of a current source signal data word and a stored last preceding data word;

(c) latching said output signal into a last data word latch circuit for use with the next succeeding current source signal data word;

(d) continuously checking the signals received in step (a) to determine whether said source signals continue to be received by said analog-to-digital converter; and (e) resetting at least part of said analog-to-digital converter to an idle condition in response to a finding in step (d) that said source signals are not being received by said analog-to-digital converter, means responsive to said digital source signals for electronically storing said digital source signals, means responsive to said electronically stored source signals for making a master library recording of said digital signals, said means for making said master library recording including means for recording said digital signals in said electronically stored source signals on a video tape cassette, means responsive to a playback of said master library recording for electronically storing the digital signals played back from said master library recording, said electronic storage means having an array of large scale memory chips, each of said chips being capable of storing at least 1 Mbit of information, each of said chips having an input port and an output port, all of said input ports being connected in parallel and all of said output ports being connected in parallel, and means responsive to addresses transmitted into said array on an address bus common to all of said chips for selecting between said input ports and said output ports, so that the entire array of memory chips behaves as a single and unitary large scale electronic memory, and means responsive to said electronically stored master library signals played back from said master recording for making duplicate recordings, whereby a plurality of duplicate recordings may be made from signals in said electronic storage without requiring any mechanical moving parts or any further playback of said master library recording while said signals remain in said electronic storage.

* * * * *

UNITED STATES PATENT AND TRADEMARK OFFICE
CERTIFICATE OF CORRECTION

PATENT NO. : 5,021,893
DATED : June 4, 1991
INVENTOR(S) : Scheffler

It is certified that error appears in the above-identified patent and that said Letters Patent is hereby corrected as shown below:

Column 14, line 10, delete "electronically stored" and insert --digital--.

Column 14, line 47, delete "an" and insert --a--.

Signed and Sealed this

Twelfth Day of January, 1993

Attest:

DOUGLAS B. COMER

*Attesting Officer*    *Acting Commissioner of Patents and Trademarks*